(12) United States Patent
Mohanty et al.

(10) Patent No.: US 8,636,971 B2
(45) Date of Patent: Jan. 28, 2014

(54) CROSSLINKED POLYMER-CARBON SORBENT FOR REMOVAL OF HEAVY METALS, TOXIC MATERIALS AND CARBON DIOXIDE

(75) Inventors: Dillip K Mohanty, Mt. Pleasant, MI (US); David J Matty, Mt. Pleasant, MI (US)

(73) Assignee: Central Michigan University, Mt. Pleasant, MI (US)

( * ) Notice: Subject to any disclaimer, the term of this patent is extended or adjusted under 35 U.S.C. 154(b) by 0 days.

(21) Appl. No.: 13/585,172

(22) Filed: Aug. 14, 2012

(65) Prior Publication Data

US 2012/0308461 A1 Dec. 6, 2012

Related U.S. Application Data

(63) Continuation-in-part of application No. PCT/US2011/025583, filed on Feb. 21, 2011.

(51) Int. Cl.
*B01D 53/56* (2006.01)

(52) U.S. Cl.
USPC .................. 423/240 S; 502/402; 423/210

(58) Field of Classification Search
USPC ................... 423/240, 210; 502/402
See application file for complete search history.

(56) References Cited

U.S. PATENT DOCUMENTS

| | | | |
|---|---|---|---|
| 3,329,649 A | 7/1967 | Wei et al. | |
| 3,875,125 A | 4/1975 | Whitehurst | |
| 4,157,438 A | 6/1979 | Blount | |
| 4,305,827 A | 12/1981 | Sasaki | |
| 5,589,540 A | 12/1996 | Shihua | |
| 6,011,196 A * | 1/2000 | Wang et al. | 604/368 |
| 6,096,813 A | 8/2000 | Schimmel et al. | |
| 6,268,452 B1 | 7/2001 | Kato et al. | |
| 6,395,678 B1 | 5/2002 | Summers, Jr. et al. | |
| 6,953,494 B2 | 10/2005 | Nelson, Jr. et al. | |
| 2004/0082744 A1 | 4/2004 | Klipper et al. | |
| 2006/0231487 A1 | 10/2006 | Bartley et al. | |

* cited by examiner

*Primary Examiner* — Colleen Dunn
*Assistant Examiner* — Haytham Soliman
(74) *Attorney, Agent, or Firm* — Technology Law, PLLC; Karen L. Kimble

(57) ABSTRACT

A polymer-carbon sorbent for removing carbon dioxide, heavy metals and toxic materials from a flue gas from a combustion process, such as coal-fired power plants, is described. The sorbent comprises a carbonaceous sorbent material and a cured amine-containing polymer, and sulfur. The polymer-carbon sorbents are formed by curing a curable amine-containing polymer in the presence of the carbonaceous sorbent material, sulfur, a cure accelerator and, optionally, a cure activator. A convenient carbonaceous sorbent material is an activated carbon, and a convenient curable amine-containing polymer is an allyl-containing poly(ethyleneimine), having a number average molecular weight between about 1,000 and about 10,000. The polymer-carbon sorbents may contain sulfur in excess of an amount needed to cure the curable amine-containing polymer. Such polymer-carbon sorbents are shown to capture more mercury, in both elemental an ionic forms, compared to activated carbon and adsorb carbon dioxide.

14 Claims, 9 Drawing Sheets

Step 2.

Step 3.

Step 4.

Step 5.

CROSSLINKED POLYMER-CARBON SORBENT FOR REMOVAL OF HEAVY METALS, TOXIC MATERIALS AND CARBON DIOXIDE

RELATED APPLICATIONS

The present application is a continuation-in-part of and claims benefit of PCT/US2011/025583, filed 21 Feb. 2011, which claims benefit of PCT/US2010/000501, filed 22 Feb. 2010.

BACKGROUND

1. Field of Invention

This invention relates to polymer-carbon sorbents suitable for removing heavy metals and toxic pollutants from flue gas, and adsorption of carbon dioxide. More specifically, this invention relates to a polymer-carbon adsorbent comprising a cured amine-containing polymer and a carbonaceous sorbent material to reduce emissions of elemental mercury and oxidized mercury and carbon dioxide from coal-fired power plants.

2. Description of the Related Art

Many heavy metals, especially mercury, are both hazardous and poisonous. Consequently, there is frequently a need to remove heavy metals, including mercury, from air streams around industrial processes such as chlor-alkali plants, iron ore processing, steel manufacturing, mining operations, and electronics manufacturing operations.

Mercury is a chemical of global concern specifically due to its long range environmental transport, its persistence in the environment once introduced, its ability to bio-accumulate in ecosystems, and its significant negative effects on human health and the environment. Mercury can be present in both liquid and gaseous waste streams. Mercury in gas streams provides additional challenges because of the volatility of metallic mercury and its compounds, which results in small quantities of mercury vaporizing from the heat of industrial processes, the burning of incinerator waste, and the burning of mercury-containing fuels.

Several approaches have been developed for effectively removing mercury species and other heavy metals from various streams. These overall approaches include, among others: liquid scrubbing technologies, homogenous gas-phase technologies, metal amalgamation techniques, and processes using various sorbent materials in different application schemes.

Capturing and isolating gaseous, elemental mercury from coal-fired power plants is a difficult technical problem because the gas volumes involved are great, the concentrations of mercury in the gas are low, and the gas temperatures are relatively high. Mercury typically exists as a trace element in coal, about 0.1 ppm by weight, although this can vary between coal types. As coal burns, the mercury volatilizes to form thermodynamically favored gaseous elemental mercury, $Hg^0$. In the subsequent cooling of the combustion gases, interaction with other combustion products results in a portion of the elemental mercury being converted into gaseous oxidized form of mercury, $Hg_2^{+2}$ and $Hg^{+2}$ ions. Oxidation makes mercury easier to remove in a wet scrubber system, because most of the compounds formed from oxidized mercury are water-soluble, although toxic. The $Hg^0$ is difficult to control, and is likely to enter the atmosphere because of its high vapor pressure and low water solubility. Small portions of $Hg^0$, $Hg_2^{+2}$, and $Hg^{+2}$ absorb onto residual particulates, such as fly ash, forming particle-bound mercury ($Hg^P$) that can be removed by filter or electrostatic precipitator.

A common practice for both gas and liquid removal of heavy metals is to contact the gas or liquid with a solid sorbent. "Sorbents" is a more general term used collectively for absorbents, which draw the heavy metal into their inner structure; adsorbents, which attract heavy metals and holding them to their surfaces; and chemisorbents, which form bonds between the surface molecules of the sorbent and the heavy metal species in a liquid or gas. Sorbents are typically in the form of particles, powders, or granules. Finely divided or microporous materials presenting large areas of active surface are strong adsorbents. Common adsorbents include activated carbon, activated alumina, and silica gel. Some sorbents, because of their size, shape, pore size, or chemical treatment, use more than one mechanism for removal of heavy metals. For example, some adsorbents may be treated or modified with materials, forming chemisorbents that will react with a heavy metal species.

Activated carbons are useful sorbents for sequestering mercury vapors in many applications, and have been studied extensively for use in flue gases. In small-scale gas processing, activated carbons may be used in fixed bed reactors or columns. However, for applications having large volumes of hot gas, such as coal-fired power plants, a fixed bed reactor or column may have cost issues associated with a large pressure drop, and maintenance of a fixed bed or column.

A number of inventive methods have been developed to apply mercury sorbent technologies to the large-scale gas streams of coal combustion for power generation. Moller et al., U.S. Pat. No. 4,889,698, and Chang, U.S. Pat. No. 5,505,766, for example, both describe the injection of fine powdered activated carbon (PAC) into flue gases at points along their journey through various pollution-control equipment trains. The PAC was then captured by a fabric filter. However, only about 15% of coal-fired boilers in the United States have such fabric filters, which allow for a high degree of mass transfer as the mercury-laden flue gas through a layer of the sorbent on the fabric filter bags. On the other hand, about 65% of United States coal-fired utility boilers have electrostatic precipitators (ESPs) instead of fabric filters, with no desulfurization systems for flue gases. An ESP configuration requires in-flight mercury removal, with some amount of time on the ESP plates parallel to the gas flow. That is, ESP configuration typically has less mass-transfer available to remove mercury vapor, compared to a flow of flue gas through a fabric filter.

Nelson, in U.S. Pat. No. 6,953,494, incorporated herein by reference, teaches a mercury-control method that can be applied to a number of combustion gas streams and a wide range of exhaust system configurations. Nelson teaches that activated carbon treated with bromine provides a more effective mercury sorbent material than untreated carbon or carbon treated with other halides. Bromine oxidizes the elemental mercury to toxic water soluble $Hg^{+2}$ salt. Nelson's mercury treated activated carbon sorbent is especially suitable for in-flight removal of mercury. Nelson describes several configurations for use of in-flight removal of mercury that demonstrate the temperatures and contact times used in such processes.

FIG. 1 through 4 are schematic diagrams of exhaust gas systems describing example methods for using sorbents to remove and sequester mercury from hot combustion gases.

FIG. 1 shows an example system that applies mercury sorbents to a combustion gas stream where a fabric filter (baghouse) is utilized to collect fly ash generated during combustion. Coal, industrial wastes, or other fuels are combusted in a boiler 11 generating mercury-containing flue gas, which is cooled by steam tubes and an economizer 21. Flue gas typically then flows through ductwork 61 to an air cooler 22, which drops the gas temperature from about 300-to-400° C. down to about 150-to-200° C. and exits the air cooler in ductwork 62.

A mercury sorbent, stored in a container such as a bin 71, is fed to and through an injection line 72 to the ductwork 62 and injected through a multitude of lances to be widely dispersed in the hot combustion flue gas. Mixing with the flue gas, the sorbent adsorbs target heavy metal species, elemental mercury and oxidized mercury species from the flue gas. The sorbent flows with flue gas to a fabric filter 31 and is deposited on the filter bags in a filter cake, along with the fly ash and other gas-stream particulates. In the fabric filter the flue gas is forced through the filter cake and through the bag fabric. The flow of flue gas through the filter cake causes intimate contact between the sorbents and the remaining mercury in the flue gas, and will result in a high degree of mercury capture with a high degree of utilization of the sorbents. Cleansed of its mercury content and particulates, the flue gas exits the fabric filter 31 to ductwork 63, a smokestack 51, and then to the atmosphere. Upon cleaning of the fabric filter bags, the mercury sorbents in the filter cake fall into hoppers and are eventually emptied 81 from the fabric filter 31, and are disposed of along with the collected fly ash and unburned carbon. The mercury sorbents will generally make up on the order of 1 wt % of the collected particulates in pulverized coal power-plant applications.

FIG. 2 describes an example application of sorbents to a plant which has "cold-side" electrostatic precipitator (ESP) 32 instead of a fabric filter. Using an ESP provides a more difficult situation for mercury removal than with a fabric filter, because flue gas is not forced through the mercury sorbent in a filter cake layer of a collection bag. The hot mercury-containing combustion gas is generated in the boiler 11, as in FIG. 1, and flows through the same equipment to the ductwork 62. The mercury sorbent of bin 71 is similarly injected 72 into the ductwork to mix with the flue gas. Because of poorer mass transfer within the ESP 32, however, it is particularly important to inject at 72 as far ahead of any turning vanes, flow distributors, ductwork, and other exposed surface-area in the ductwork as possible. This not only provides more residence time for the sorbents to mix with and remove mercury from the flowing gas, but provides for more mass transfer area for the sorbent to collect on, further increasing the overall mass transfer and mercury removal. In the ESP 32, the sorbents are collected on plates with the fly ash and upon rapping of the plates are eventually discharged 81 from the ESP 32 for disposal along with the rest of the particulates.

Several variations on arrangements of FIGS. 1 and 2 might be suggested, based on a configuration of existing air pollution control equipment. For example, a wet scrubber for flue gas desulfurization could appear at 63 in FIGS. 1 and 2 or a particulate scrubber could replace ESP 32. Selective catalytic reduction (SCR) units for $NO_x$ reductions, which also can reduce $Hg^{+2}$ to elemental mercury or flue gas conditioning systems to improve particulate removal, could also be placed in the equipment arrangements. Similarly, mercury sorbents could be injected while mixed in with sorbents for other flue gas components, such as calcium or magnesium hydroxide or oxide for flue gas $SO_3$, HCl, or $SO_2$, rather than injected alone. Alternately, the mercury sorbents could be injected in liquid slurry, which would quickly evaporate in the hot flue gas.

FIG. 3 applies the sorbents in a TOXECON® arrangement, a process patented in U.S. Pat. No. 5,505,766, and marketed by Electric Power Research, Inc., Palo Alto, Calif. Mercury sorbents 71 are injected after an ESP 32 into almost particulate-free ductwork 67 before a small, high-velocity fabric filter 33. In this manner the fly ash 80 does not become mixed with the carbonaceous sorbents, allowing the fly ash to be sold for concrete use. Moreover, the filter cake of fabric filter 33 would predominantly be mercury sorbent, allowing a longer residence time, higher utilization levels, and the possibility of recovering and re-injecting the sorbent to lower costs.

FIG. 4 illustrates sorbent usage at plants that have spray dryers for acid rain control. A mercury sorbent could be injected 62 before the spray dryer 41, into the spray dryer 41, into the ductwork 68, between the spray dryer and the particulate collector 31 or 32, or mixed in with the scrubber slurry itself.

Mercury has a high affinity for sulfur. Elemental mercury, in the presence of sulfur, readily forms mercury (II) sulfide when heated. Mercury (II) sulfide can exist in two chemically stable forms: a red, hexagonal complex (cinnabar), and a black metastable structure (metacinnabar). Mercury also readily forms complexes with other sulfur compounds, including sulfates ($HgSO_4$), dithiocarbamates ($Hg(Et_2 DTC)_2$) and various thioethers ($Hg(SR)_2$). The affinity of mercury for sulfur has lead to many studies of sulfur-treated carbon adsorbents for the removal of mercury. See, for example, Bylina et al., *Journal of Thermal Analysis and calorimetry* (2009), 96(1), pp 91-96 "Thermal analysis of sulfur impregnated activated carbons with mercury absorbed from the Vapor Phase"; and Skrodas et al., *Desalination* (2007), 210(1-3), 281-286, "Role of activated carbon structural properties and surface chemistry in mercury adsorption."

Sorbents in liquid systems typically include those with ionic groups to capture materials in solution. The ionic groups may be inherent in the sorbent material, or added through a treatment of another sorbent such as activated carbon. Materials such as amines and polyamines have been studied for use in removing metal ions. Polyamines are organic compounds that contain two or more primary amino groups. Polyamines generally have cations that are found at regularly-spaced intervals (unlike, say, $Mg^{++}$ or $Ca^{++}$, which are point charges).

Amines reacted with activated carbon have been studied for use in purifying water. Akio Sasaki, in U.S. Pat. No. 4,305,827, also teaches an adsorbent, obtained by reacting active carbon with a water-soluble amine and carbon disulfide, in the presence of water. The adsorbent is useful in removing heavy metals, especially mercury, silver, gold, copper, and cadmium from water. The preferred amines are divalent or polyvalent amines, including aromatic amines and poly(ethyleneimine). The adsorbents hold their adsorptive function well after being washed. Sasaki proposes that the amines react on the surface of the activated carbon; however, recently, there is some question that this occurs.

Sasaki, et al. studied a sorbent formed by reacting polyamines with $CS_2$ in water, in the presence of palm-shell activated charcoal for used in removing $Hg^{+2}$ ions in water. [See Sasaki, Akio, Kimura Yohiharu, *Nippon Kagaku Kashi*, 12, 880-886, (1997), "Preparation of polythiourea-immobilized activated charcoal and its utilization for selective adsorption of mercury(II) ion. Studies on functionalization of polymers by reactive processing. Part 5."]. A Sasaki et al. propose that the secondary amine groups in the polymer backbone react with carbon disulfide to form thiourea crosslinked sites [e.g., >N—C(S)—N<].

Amine-containing polymers have been studied as sorbent materials for treatment of water. Some amine-containing polymers can be derived from natural sources. For example chitosan, is a de-acylated derivative of chitin, a glucosamine polysaccharide, is found in the shells of crabs, lobsters, and beetles. Chitosan has been used to absorb heavy metals from water and industrial waste streams. [See Hawley's Condensed Chemical Dictionary, 11$^{th}$ edition (1987).]

Masari, et al., in U.S. Pat. No. 4,125,708, describes the use of chitosan, modified with an anionic agent and glutaraldehyde, for removing superoxy-anion-forming ions, such chromium. The anionic agent is selected from sulfite, sulfate, chloride, hexafluoride, and borate groups. The glutaraldehyde serves as a crosslinking agent. Other crosslinking agents taught are glyoxal, glutaraldehyde, and dialdehyde starch. The crosslinked, anionically modified, nitrogen-containing product exhibits increased stability and insolubility over the non-crosslinked product. Masari et al. teach that such sorbents could be used by adding a filter to an already-existing industrial or municipal water purification system.

For mercury removal, use of a sulfur cure system would be attractive for polymer-carbon sorbents used in mercury removal because sulfur has an affinity for mercury. Sulfur vulcanization of polymers is used as a conventional curing system for strength and shelf life of rubber. In addition, sulfur vulcanization technology allows for a range of vulcanization speeds and elastomer properties. In vulcanization of poly (isoprene) rubber, for example, sulfur forms a bond at points of unsaturation in the polymer, forming crosslinks between the polymer chains. In these cases, the elastomer molecules must contain allylic hydrogen atoms. For additional information on curing systems see, for example, *The Science and Technology of Rubber*, (1978), edited by Frederick R. Eirich, Academic Press, New York, "Vulcanization" by A. Y. Coran, pp 291-338.

Sulfur vulcanization is usually performed with an accelerator to control the cure time and characteristics. Accelerators include a number of sulfur-containing compounds, plus a few non-sulfur types, such as ureas, guanidines, and aldehydeamines. Accelerated sulfur vulcanization has been extended to other diene synthetic rubbers, such as SBR, butyl and nitrile rubbers. Accelerators that do not decompose or react with olefins at curing temperatures require an activator selected from basic metallic oxides or salts of lead, calcium, zinc, or magnesium. Some accelerators such as zinc salts of mercaptobenzothiazole and the dithiocarbamic acids do not require an additional activator. [See, for example, *Textbook of Polymer Science*, 2$^{nd}$ Ed., Fred W. Billmeyer.]

Also the continuous rise of the atmospheric carbon dioxide concentration and its link with climate change demand a technological solution. This solution is especially needed for industries where large amounts of carbon dioxide result from burning operations, such as utility companies where coal is the fuel source. Carbon capture and sequestration to reduce such emissions have been considered for such mitigation. However, many industries use an amine-scrubbing technique as their solution; however, these methods cost can be very high. [See for example, R. S. Haszeldine, *Science* 325, 1647-1652 (2009).] Recently carbon-based support materials, such as PEI on carbon materials, have become of interest. [See, for example, D. Wang et al., *Energy Fuels* 25, 456-458 (2011).]

Therefore, a better system of polymer-carbon sorbents suitable for removing carbon dioxide, toxic materials and heavy metals from flue gas that is economical to run, especially on a commercial scale, is needed.

BRIEF SUMMARY OF THE INVENTION

The present invention provides a polymer-carbon sorbent suitable for removing carbon dioxide, heavy metal species and toxic materials from a flue gas from a combustion process, the sorbent comprising a carbonaceous sorbent material and a cured amine-containing polymer. Specifically, a polymer-carbon sorbent for removing carbon dioxide, heavy metal species and toxic materials from a flue gas from a combustion process which sorbent comprises:
  a) a carbonaceous sorbent material, and
  b) a cured amine-containing polymer wherein
    i) a sulfur agent, used to cure the curable amine-containing polymer, is selected from allotropes of elemental sulfur, which is added in excess of the amount required to cure the curable amine-containing polymer, in the presence of a carbonaceous sorbent material, and
    ii) the curable amine-containing polymer is formed by reacting an amine-containing polymer with an allyl halide.

In one particular embodiment, the polymer-carbon sorbent provides removal of both elemental and ionic forms of metals, including mercury. In another embodiment, the polymer-carbon sorbent provides removal of carbon dioxide.

One aspect of this invention is a polymer-carbon sorbent for removing heavy metals from flue gas streams. The sorbent comprises a carbonaceous sorbent material and a cured amine-containing polymer, and sulfur. The ratio by weight of the carbonaceous sorbent material to cured amine-containing polymer can range from about 5:95 to about 95:5; and more conveniently from about 50:100 to about 250:100. These ratios depend on the handling desired as well as the performance of the sorbent. Some sorbents of the invention are mixed and cured, followed by grinding and/or selecting the sorbent to a desired size. Other sorbents of the invention are formed by first creating a mixture of the carbonaceous sorbent material, curable amine-containing polymer, sulfur agent, accelerator, and, optionally, an activator, then forming the mixture into particles of a desired size and shape, and then curing the particles.

The sorbents of this invention are formed by curing a curable amine-containing curable polymer in the presence of a carbonaceous sorbent material, sulfur, a cure accelerator and, optionally, a cure activator. A convenient carbonaceous sorbent material is an activated carbon, and a convenient curable amine-containing polymer is an allyl containing poly (ethyleneimine) having a number average molecular weight between about 1,000 and about 10,000. Sulfur in a range of about 5 to about 60 parts per 100 parts by weight of polymer provides extensive crosslinking and good mercury ($Hg^0$, $Hg_2^{+2}$ and $Hg^{+2}$) removal from both gas and liquid systems.

Another aspect of this invention is providing an allyl group to an amine-containing polymer to form a curable amine-containing polymer. Preferably, the amine-containing polymer has both primary and secondary amine groups. A convenient source of an allyl group is an allyl halide, such as allyl bromide or allyl iodide. The allyl halide and amine-containing polymer react so that allyl groups replace primary amine groups at the chain termini on the amine-containing polymer. For carbon dioxide removal, the amine-containing polymer preferably has multiple available amine groups on the surface, such as poly(ethyleneimine) with allyl groups.

Another aspect of this invention is a method of removing vaporized metal species, especially mercury in the forms $Hg^0$, $Hg_2^{+2}$, and $Hg^{+2}$, from flue gas of a combustion process by contacting the flue gas with an adsorbent for a sufficient time to remove the metal species, and then removing the adsorbent before exhausting to the air. The sorbent is capable of removing both elemental and oxidized forms of the metal species.

A further aspect of this invention is removal of carbon dioxide from the flue gas stream by use of amine-containing polymers having secondary, tertiary and primary amine groups that adsorb carbon dioxide readily. The present polymer-carbon sorbent provides that amine availability. One example of such a present polymer-carbon sorbent that is advantageous contains poly(ethyleneimine) with allyl groups and carbon black in a sulfur crosslinked form. This sorbent can be used alone or with the routinely used carbon black in flue gas of coal-fired power plants. While carbon black alone adsorbs only mercury and mercury ions, the present polymer-carbon sorbents adsorb carbon dioxide and chemically bind mercury and mercury ions. Thus the present polymer-carbon sorbents have dual acting properties and are cost effective. The present polymer-carbon sorbents contain primarily secondary and tertiary amine nitrogen atoms and lack primary amine groups due to the modifications described above. The secondary and tertiary nitrogen amines are more electron rich than the primary amines which are inherent in PEI. Therefore it is expected that the present polymer-carbon sorbents will adsorb more carbon dioxide than PEI impregnated on carbon black. Furthermore, the in modified polymer-carbon sorbent described herein PEI is crosslinked. This crosslinking should prevent dissolution of PEI by the moisture present in the flue gas, unlike the materials described by Wang et al. The same investigators have reported degradation of their material in flue gas. In contrast, current studies indicate the opposite for the present polymer-carbon sorbent; the present polymer-carbon sorbent reported herein can withstand the flue gas environment for a considerable length of time.

DESCRIPTION OF INVENTION

Glossary

Figure 1:
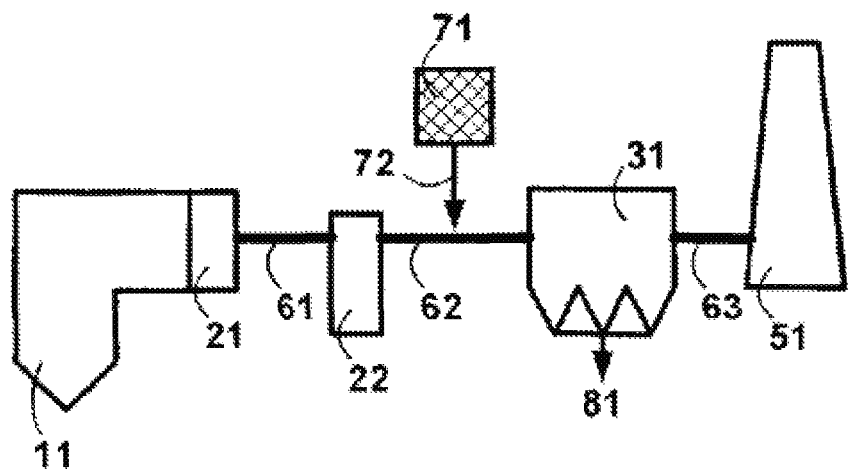
FIG. 1 A schematic of a system for injecting sorbent into a flue gas stream, prior to a filter FIG. 2 A schematic of a system for injection sorbent into a flue gas stream, prior to an electrostatic precipitator (ESP)
Figure 2:
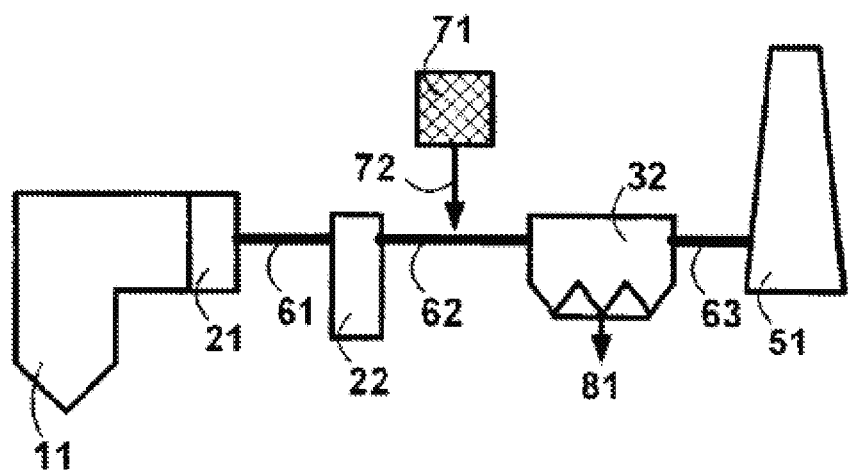

The following terms as used in this application are to be defined as stated below and for these terms, the singular includes the plural.
ACP means allyl-capped polymer
BPEI means branched poly(ethyleneimine)
CAC means FLUEPAC®-MC Plus
DH means DARCO® Hg
DHL means DARCO® Hg-LH
DMAC means dimethylacetamide
DSC means differential scanning calorimetry
DTC means dithiocarbamate
ESP means electrostatic precipitator
MAC means modified activated carbon
PAC means powdered activated carbon
TGA means thermogravimetric analyses
ZnDEDC means zinc diethyldithiocarbomate

Discussion

The present invention provides a polymer-carbon sorbent suitable for removing heavy metal species from flue gas systems, such as found in coal-fired power plants, the sorbent comprising a carbonaceous sorbent material and a cured amine-containing polymer. Specifically, a polymer-carbon sorbent for removing carbon dioxide, heavy metal species and toxic materials from a flue gas from a combustion process which sorbent comprises:
  a) a carbonaceous sorbent material, and
  b) a cured amine-containing polymer wherein
    i) a sulfur agent, used to cure the curable amine-containing polymer, is selected from allotropes of elemental sulfur, which is added in excess of the amount required to cure the curable amine-containing polymer, in the presence of a carbonaceous sorbent material, and
    ii) the curable amine-containing polymer is formed by reacting an amine-containing polymer with an allyl halide.

These present polymer-carbon sorbents that are suitable for removing heavy metal species from a flue gas are especially useful for removal of heavy metals from power plants. Coal comes in four grades; anthracite, bituminous, sub-bituminous, and lignite. Anthracite produces the highest heat energy per unit weight. It is expensive which prohibits its use in power plant boilers. Bituminous coal provides lesser heat per unit weight than anthracite and has higher chlorine content, which allows for the conversion of elemental mercury to its water-soluble ionic (toxic) forms. Most bituminous coal has been exhausted in the Americas. Thus, sub-bituminous coal and lignite are the two types of coal that are used in power plant operation. Besides their lower heat content, they have lower chlorine content. Thus, during combustion, more elemental mercury is produced. For these latter two types of coal, the chlorine contents can vary widely depending on its source. Therefore it is desirable to design a sorbent with tunable elemental mercury absorbing capacities. The present sorbent can be tailored to meet these demands. This is achieved by changing the ratio of cured amine-containing polymer and a carbonaceous sorbent material such as activated carbon. By increasing the carbon to polymer ratio, while keeping other parameters constant (S:45 parts, etc.), the mercury absorbing capacity can be decrease gradually to reach that of the lower level achieved by DARCO®-Hg-LH alone. Thus, mercury chemisorption capacity is tunable; increasing carbon content relative to the amine containing polymer systematically lowers elemental mercury loading capacity accordingly.

Amines with activated carbon, and particularly cured amine-containing polymers, have not been described for use in gaseous in-flight removal of mercury. A cured amine-containing polymer could improve capture of metals and their ions in gas treatment systems. For types of treatment systems in order to use a polymer-carbon sorbent, it would be convenient to have a polymer that has been crosslinked, to improve the handling and stability of the polymer-carbon sorbent. However, curable synthetic amine polymers with conventional curing systems have not been reported for use in removing metal ions from gases.

The present invention uses mixing and curing a carbonaceous sorbent and a curable amine-containing polymer in the presence of a sulfur agent, a cure accelerator, and optionally an activator, provides a novel adsorbent for use in removing heavy metal species, especially metallic mercury and mercury ions, from flue gas streams. Laboratory screening indicates that the resulting polymer-carbon sorbent has higher capacity for both elemental and ionic species of mercury than that of a commercially available carbon sorbent alone.

The ratio by weight of the carbonaceous sorbent material and cured amine-containing polymer can range from about 2:1, or a range of about 5:95 to about 95:5, more conveniently from about 50:100 to about 250:100. A sorbent of the invention can be mixed and cured, followed by grinding, or otherwise reducing particles of the sorbent to a desired size. For example, for use in sorbent injection systems, particles can be ground to an average particle size of less than about 100 µm, or preferably about 50 µm. A convenient range of a ratio of carbonaceous sorbent material to cured amine-containing polymer in this use is about 60:40 to about 95:5. A more convenient range of ratio of carbonaceous sorbent material to cured amine-containing polymer is about 50:100 to 250:100.

Other sorbents of the invention are formed by first creating a mixture of the carbonaceous sorbent material, curable amine-containing polymer, sulfur agent, accelerator, and, optionally, an activator, then forming the mixture into particles of a desired size and shape, and then curing the particles. For these sorbents, a convenient range of a ratio by weight of the carbonaceous sorbent material and cured amine-containing polymer, such as to hold a shape, would be from about 5:95 to about 30:70. A more convenient ratio by weight of the carbonaceous sorbent material and cured amine-containing polymer would be from about 5:100 to about 50:100 parts by weight. These ratios will depend on the lower limit of carbon that must be present to get a curable mixture. The amount and molecular weight of curable amine containing polymer affects processing to form shapes by, for example, spraying fine particles, extrusion, or molding. Adsorbents that are larger in size may be more useful in fixed bed filters or columns Convenient sizes foe use in liquid systems typically range from about 100 µm to as large as about 5 mm in the longest dimension.

The carbonaceous sorbent materials of this invention are selected from activated carbon, treated activated carbon, powdered activated carbon, activated charcoal, activated coke, char, incompletely burned carbon from a combustion process, crumb rubber of appropriate mesh size (400-450) and carbon black. Convenient sources of carbonaceous sorbent materials are commercially available activated carbons and treated activated carbons. Even more convenient are activated carbons that are treated on the surface for use in removing contaminants from flue gas streams. Such treatments may include sulfur or bromine, for example, to enhance adsorption of mercury. Examples of such treated activated carbons include FLUEPAC®-ST and FLUEPAC®-MC Plus, from Calgon Carbon Corporation, Pittsburgh Pa., and DARCO® Hg and DARCO® Hg-LH, from Norit Americas Inc., Marshall Tex. These treated activated carbon products are provided as powders.

The curable amine-containing polymers of this invention are formed by modifying an amine-containing polymer with an allylic compound to form allyl end-groups. Suitable amine-containing polymers contain primary and/or secondary amine groups along its chain and end-groups, or on pendent groups along the chain. Such amine-containing polymers include poly(p-aminostyrene), poly(allylamines), poly (aniline), poly(vinylamine) and its copolymers, poly (ethyleneimine), chitosan, amine containing copolymers, and the like.

An aspect of this invention is a method to add an allyl group to an amine-containing polymer by reacting amine end-groups on the polymer, or on pendant chains on the amine-containing polymer, with an allyl halide to form a curable amine-containing polymer of this invention. Addition of the allyl group takes place in the presence of a strong base, and a solvent, preferably a solvent with a relatively large dielectric constant. Convenient allyl halides include allyl bromide or allyl iodide. Convenient bases include potassium carbonate, and sodium carbonate. Convenient solvents include dimethylacetamide, N-methyl-pyrrolidinone, dimethyl sulfoxide and N,N-dimethylformamide.

An example of such a method is the reaction between branched poly(ethyleneimine) and allyl bromide that demonstrates the formation of a curable amine-containing polymer. The allyl bromide reacts with amine end-groups on the poly (ethyleneimine), in the presence of potassium carbonate and a solvent with a relatively large dielectric group, such as dimethylacetamide (DMAC), to form a polymer with (secondary) amine groups in the chain and allyl end-groups. While not wishing to be bound by theory, it is believed that the potassium carbonate assists the reaction by reacting with HBr, the by-product of the reaction.

FIG. 5 gives a schematic representation of the reaction of allyl bromide with a branched poly(alkyleneimine), in the presence of potassium carbonate, to form a curable amine-containing polymer of this invention. The poly(alkyleneimine) has pendant chains with primary amino end-groups. A primary amine group on a poly(alkyleneimine) reacts with the allyl radical from the allyl bromide. During the reaction, primary amines in the polymers are converted to secondary amines, and terminal allyl end-groups are introduced into the polymer. The terminal allyl end-groups are then available to facilitate crosslinking, so that the result is a curable amine-containing polymer.

Secondary amines are less nucleophilic than primary amines. However, if an excess of allyl bromide is available, some reaction between the allyl bromide and secondary amines might occur.

The reaction to form curable amine-containing polymers of the present invention can take place using conventional chemical mixing equipment. For example, a stirred, jacketed reactor will be useful. When the reaction is exothermic, the jacket may be supplied with a cooling liquid to control temperatures. If a polymer is selected that is near 10,000 Mw, equipment suitable for medium to high viscosity, such as double arm mixer, planetary mixer, plastic extruder, or the like may be more useful. Again, cooling of the mixing equipment is useful to control temperatures. (Suitable equipment manufacturers include B & P Process Equipment, Saginaw, Mich., and Charles Ross & Son Company, Hauppauge, N.Y.)

In an aspect of this invention, curable amine-containing polymers are vulcanized in the presence of a carbonaceous sorbent material to form a polymer-carbon sorbent. There are several general methods of vulcanizing polymers having allyl groups. Examples of conventional methods for vulcanization of allyl groups, as discussed above in the background, include use of accelerated sulfur vulcanization, peroxide catalysts, and chain extension. Sulfur vulcanization has the advantage of providing additional sulfur to the polymer-carbon sorbent, beyond any that may already be present on the carbonaceous sorbent material. A sulfur agent is used for vulcanization in this invention. A sulfur agent is $S_8$, which may be in orthorhombic, monoclinic, and amorphous forms. Preferably, the sulfur agent is added in an amount more than twice the amount required to cure the curable amine-containing polymer.

In one aspect of this invention, it has been found that sulfur vulcanization is useful for curing an allyl-capped poly(alkyleneimine) in the presence of activated carbon. Sulfur vulcanization of other polymers with allyl groups results in a polymer with sulfur crosslinks; the allyl groups remain in the polymer. For example, when poly(cis-1,4-isoprene) rubber is crosslinked using elemental sulfur, sulfide bridges are introduced between chains of the polymer. In another aspect of this invention, sulfur vulcanization is useful when curing poly(alkyleneimine) in the presence of an activated carbon that is treated with bromine.

While not wishing to be bound by theory, it is believed that the sulfur used in the vulcanization provides additional chemical binding of some heavy metal species. For example, sulfur reacts readily with mercury to form HgS, which is found as cinnabar in nature. Thus if HgS can be made as a product of this present process, it is environmentally preferred.

Use of an accelerator with sulfur vulcanization allows control of the curing time, temperature, and the properties of the resulting cured amine-containing polymer. An accelerator can be selected from any of the traditional accelerators used in sulfur vulcanization. Accelerators used in sulfur vulcanization include a number of sulfur-containing compounds, such as thioureas, thiophenols, mercaptans, dithiocarbamates, xanthates, trithiocarbamates, ditihio acids, mercaptothiazoles, mercaptobenzothiazoles, and thiuram sulfides, plus a few non-sulfur types, such as ureas, guanidines, and aldehydeamines.

Optionally, an activator is used to start the vulcanization reaction. Accelerators that do not decompose or react with olefins at curing temperatures require an activator selected from basic metallic oxides or salts of lead, calcium, zinc, or magnesium. However, some accelerators such as zinc salts of mercaptobenzothiazole and the dithiocarbamic acids do not require an additional activator, and may be more convenient. In the present invention, an activator is optional, and required only if such a zinc salt is not used.

An example of such a convenient accelerator is zinc diethyldithiocarbamate (ZnEDC). While not wishing to be bound by theory, FIG. 5 depicts sulfur vulcanization of a polymer containing an allyl group, using ZnEDC. In Step 1, the ZnEDC initiates the reaction by undergoing hemolytic cleavage to form two identical radicals. In Step 2, two of these radicals then come together to open the sulfur ring, to form a polysulfide chain. In Step 3 the reaction proceeds by abstraction of an allylic hydrogen, followed by rearrangement of the double bond. In Step 4, the other accelerator moiety is eliminated via hemolytic cleavage, leaving a terminal radical on the polysulfide group. In Step 5 the terminal radical attacks the alpha carbon on a second allyl group, resulting in a crosslinked polymer. The crosslink that is formed is a polysulfide bridge, and the double bonds remain in the polymer, some of which can also interact with $S_8$ to form cyclic polysulfides.

The cure time and temperature for vulcanization is dependent on the accelerator and activator used for curing. It is convenient if the cure temperature is well below the decomposition temperature of the amine-containing curable polymer. The decomposition temperature can be determined by standard techniques, such as TGA. (It should be noted that the cure is exothermic as heat is needed to form the initiator species, as evidenced by DSC.)

The polymer-carbon sorbent of this invention can be cured with sulfur vulcanization; as one such example, with 7 parts sulfur in 100 parts amine-containing curable polymer, with 200 parts bromine-treated activated carbon and 1 part zinc diethyldithiocarbamate accelerator. Curing for this example recipe can take place at about 111° C. for about 30 minutes.

The polymer-carbon sorbents of this invention are made by conventional methods for compounding polymers with particles and curing agents. When the curable amine-containing polymer and carbonaceous sorbent material are both in solid form, they can be ground together with sulfur, accelerator and optional activator. Alternatively, a solvent can be used to dissolve polymer and suspend solid ingredients, including the carbonaceous sorbent material.

The type of equipment used to mix the uncured polymer-carbon sorbents will depend on any solvents that are used, the viscosity of curable amine-containing polymer in solution, the loading of carbonaceous sorbent material, the expected cure rate, and whether the process is to be batch or continuous. For extremely high viscosity mixtures, planetary mixers, extruders, roll mills, and the like may be needed to combine the carbonaceous sorbent material with the curable amine-containing polymer. (Manufacturers of suitable equipment include, for example, B & P Process Equipment, Saginaw, Mich., and Charles Ross & Son Company, Hauppauge, N.Y. and other manufacturers.)

The equipment should provide for heating or cooling of the ingredients, depending on whether the vulcanization reaction is endothermic or exothermic, respectively. The temperature during mixing of amine-containing curable polymer and carbonaceous sorbent material will depend on the temperature required by the accelerator and optional activator. If the ingredients are mixed before curing, it is convenient to maintain the temperature several degrees below the cure temperature. For many accelerators, it is convenient if the temperature is maintained at about 25° C. or below. Curable amine-containing polymer, carbonaceous sorbent material, sulfur, accelerator and activator may be mixed in a batch mixer, without heating, and then transferred to a heated press or mold for curing. Alternatively, the ingredients may be added to a continuous process such as an extruder or tank, and then heated after extrusion or spraying to form cured particles. When fully cured, the polymer-carbon sorbents of this invention possess similar or superior thermal stability so that they can be used to replace activated carbon to treat flue gasses or chemical process wastes.

In another aspect of this invention, it was found that it is necessary to cure the curable amine-containing polymer in the presence of an effective amount of carbonaceous sorbent material. In addition to acting as a sorbent, the carbonaceous sorbent material acts as a reinforcement material and as a filler.

For a particular combination of polymer and carbon, a sulfur saturation point can be determined by examining the polymer-carbon solvent for free sulfur, for example, testing the sample by DSC before and after a cure step. To determine saturation for a given polymer, polymer-carbon sorbent samples with increasing amounts of sulfur can be cured and compared. Before saturation, the presence of peaks in a DSC thermogram, corresponding to the melting points of sulfur $S_8$ allotropes at 112° C. and 119° C., disappear when the polymer is cured. After saturation, the peaks at 112° C. and 119° C. remain, even after the polymer is cured, indicating free sulfur is available.

In yet another aspect of this invention, polymer-carbon sorbents are treated with 2-mercaptoethanol to introduce thiol moieties into the samples. For example, polymer-carbon sorbents may be treated with 2-mercaptoethanol, which reacts with a disulfide crosslink in the polymer-carbon sorbent by cleaving the disulfide bonds. Thiols have a high affinity for Hg⁰ as well Hg$^{+2}$. Therefore, adding thiol groups to a polymer-carbon sorbent can increase overall mercury capture.

Another aspect of this invention is a method of removing vaporized metal species, especially mercury in the forms of Hg⁰, Hg$_2^{+2}$, and Hg$^{+2}$, from flue gas of a combustion process by contacting the flue gas with an adsorbent for sufficient time to remove the metal species and then removing the adsorbent before exhausting to the air. The sorbent is capable of removing both elemental and oxidized forms of the metal species. In particular, it is an aspect of this invention to provide a method to use polymer-carbon sorbents to remove vaporized metals and metal ions from combustion streams by injecting a polymer-carbon sorbent into the flue gases, as described above. Any of the equipment for or variations to injection systems known in the art, such as electrostatic precipitators, bag filters, and others, may be useful to remove the polymer-carbon sorbent before the flue gasses exit the system. The effectiveness or working life of the polymer-carbon sorbent may be extended by taking advantage of other systems for sulfur or NO$_x$ to remove other contaminants from the system. The present polymer-carbon sorbent is able to absorption of elemental mercury capacity of about three times that of DLH, with fewer injections into the flue gas and/or has a longer residence time.

Figure 3:
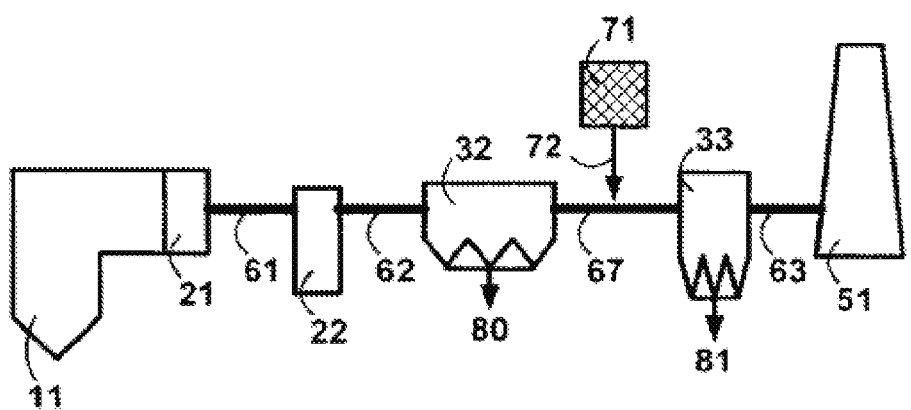
FIG. 3 A schematic of a system for injecting sorbent into a flue gas stream after an ESP FIG. 4 A schematic of a system for injecting sorbent into a flue gas stream before a spray dryer FIG. 5
Figure 4:
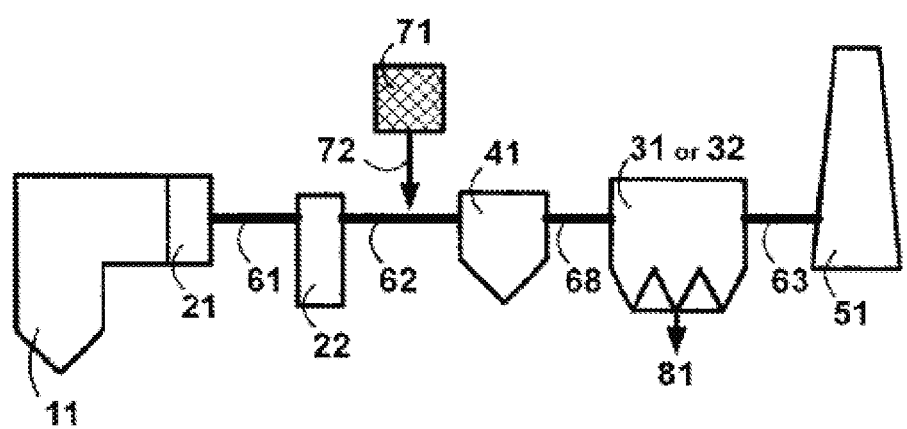
Figure 5A:
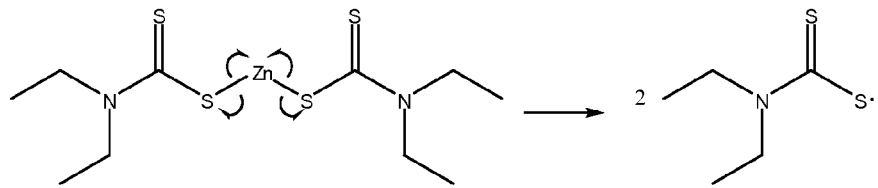
FIG. 5a shows Steps 1-3 and FIG. 5b shows Steps 4 and 5 of a reaction to form an allyl-capped poly(ethyleneimine) (ACP) with crosslinking of the ACP with sulfur and zinc diethyldithiocarbamate FIG. 6 Schematic of equipment setup for testing elemental mercury adsorption FIG. 7 Capture of elemental mercury in mg $Hg^0$ by parts weight sulfur used for polymer-carbon sorbent FIG. 8 Capture of ionic mercury in mg $Hg^{+2}$ by parts weigh sulfur used for polymer-carbon sorbent
Figure 5A:
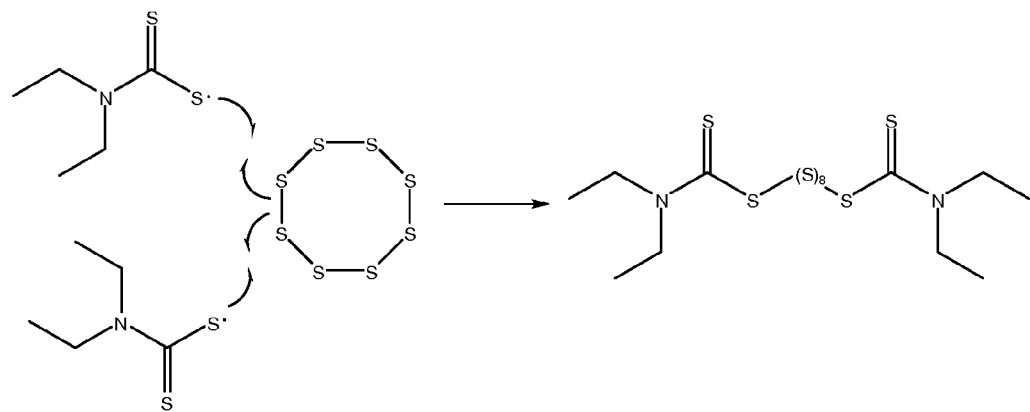
Figure 5A:
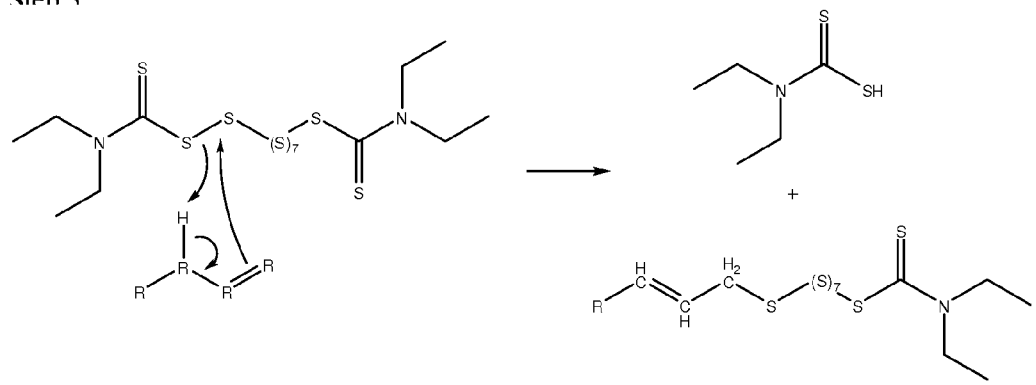
Figure 5B:
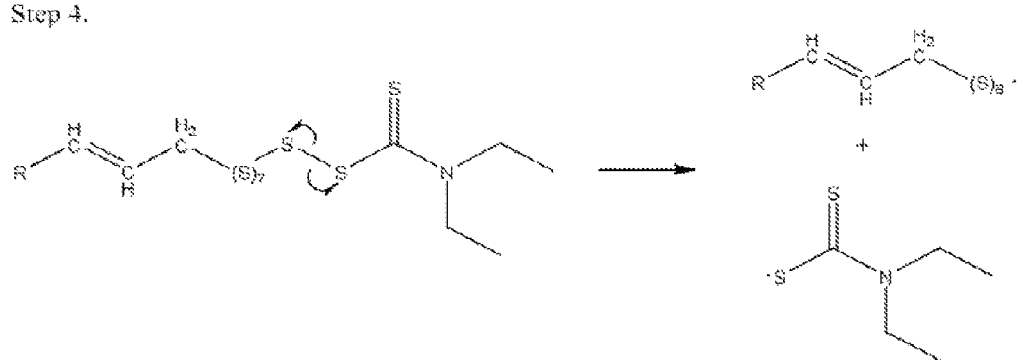
Figure 5B:
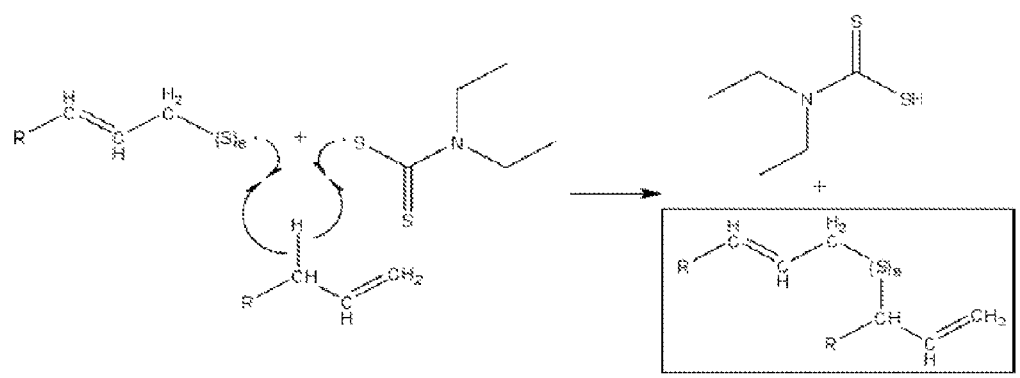

A particularly convenient approach for injection of a polymer-carbon sorbent to flue gases includes a TOXECON® arrangement, as shown in FIG. 3. In such an arrangement, fly ash and other solids are removed before the injection of a polymer-carbon sorbent. Such a process allows recovered fly ash to be sold as a by-product and the polymer-carbon sorbent to be captured for regeneration or for reuse as a source of mercury. This process is of limited utility, because, complete removal of particulate mercury from fly ash is not feasible. The adsorption-desorption of mercury from the adsorbent does not guarantee complete removal of adsorbed species.

In order to be useful in an injection system, the particles of the polymer-carbon sorbent must be kept in suspension in the flue gas until it reaches a filter or ESP for collection. Typically this means that the particles are kept small and have surface properties that do not promote clumping. In addition, particles that are captured in a filter need to allow continued gas flow without causing a large pressure drop. Useful particles are less than about 100 μm, and more conveniently less than about 50 μm.

Yet another aspect of this invention is removal of heavy metal species, such as arsenic, cadmium, cesium, copper, gold, iron, lead, mercury, palladium, platinum, plutonium, selenium, silver, strontium, thallium, uranium or mixtures thereof from mining or industrial wastewater streams. Removal of toxic materials, such as the heavy metal species of perchlorate or arsenate, that have the polymer-carbon sorbent further modified with appropriate modifications to an existing system can also be a use of the present sorbents.

When a fluid, such as flue gas containing water or liquids, is to be treated with the present sorbents, then the absorbent media can be formed into beads, pellets, filter, film, and others for use. The mixture is formed into the adsorbent media and then cured. The present polymer-carbon sorbent may be used in conventional ways for such fluids, such as fixed beds, columns, or other means, whereby that heavy metal is contacted with the sorbent as the fluid passes and, if desired, the sorbent can be extracted and the polymer-carbon sorbent regenerated. Typical methods are used to recycle the gas as needed over the sorbent.

In most methods for using the polymer-carbon sorbents of this invention, it may be useful to contact a fluid stream, such as flue gas, with the sorbent more than once to remove additional heavy metal species. When extra treatment is desired, a recycle loop can be added to a fluid treatment system. For example, referring to FIG. 3, a recycle loop would divert stream 63 to re-enter the flue gas stream 67, ahead of sorbent injection site 71. Similarly, in a fixed bed or column, a recycle may be run from the exit of the fixed bed or column to the entrance.

In another aspect of this invention, the polymer-carbon sorbents of this invention can be used to treat solid waste that contains mercury. Solid waste is treated with a solvent or caustic and/or acidic solution capable of dissolving mercury species. The solution is then treated by contacting it with a polymer-carbon sorbent to remove mercury in its elemental or ionic form. It should be pointed out that the existing and highly prevalent method of oxidizing elemental mercury to ionic form only renders it water-soluble. This enables water-soluble mercury species to enter the water stream. The subsequent fate of these salts is unknown.

In another aspect of this invention, polymer-carbon sorbents that are used to collect mercury species can be further treated to reclaim the mercury and recycle the sorbent.

While not wishing to be bound by theory, it is believed that all of the elemental mercury on the polymer-carbon sorbent is present as HgS (cinnabar). Experimental findings strongly suggest that the ionic mercury species are bound to the polymer-sorbent by strong co-ordination with nitrogen atoms present in the polymer-sorbent. Mercury as a metal is valuable, and methods for recovering mercury or cinnabar from waste streams are known in the art and may prove useful here.

EXAMPLES

The following examples are presented to clarify, but not limit, the scope of the invention.

Materials

With the exception of activated carbon, all reactants and solvents were purchased from Aldrich Chemical Company, Milwaukee, Wis. Branched poly(ethylenimine)s (BPEI) having nominal number-average molecular weights (Mn) of about 10,000, 2,000 and 1,300, zinc diethyldithiocarbomate (ZnDEDC), orthorhombic sulfur, toluene and methanol were used as purchased. Allyl bromide was distilled prior to use. Dimethylacetamide (DMAC) was distilled over calcium hydride at reduced pressure.

Three activated carbons commercially used in flue gas treatment, (CAS #7440-44-0) were tested to compare with the sorbents of the invention. One activated carbon FLUEPAC®-MC Plus (CAS #7440-44-0) from Calgon Carbon Corporation, Pittsburgh, Pa. (CAC), and DARCO® Hg (DH) and DARCO® Hg-LH (DHL) from Norit Americas Inc., Marshall, Tex. The activated carbon tested in polymer-carbon sorbents of the invention was DARCO® Hg-LH Powdered Activated Carbon from Norit Americas, Inc., Marshall, Tex., an impregnated lignite coal-based activated carbon. DARCO® Hg-LH, abbreviated DHL, was used to make the polymer-carbon sorbent in the examples; DHL has a proprietary bromine treatment specifically for removal of mercury from flue gas emissions from burning low halogen fuels. It has and average sulfur content of 1.2 weight percent. (Norit Activated Carbon Datasheet No. 1121, June 2007, Norit Americas, Inc.)

Celite® diatomaceous earth, Mallinkrodt Baker Inc, Phillipsburg, N.J. was used as a filter media to purify products.

Measurements

Thermogravimetric analyses (TGAs) were performed using a TA Instruments 2590 Hi-Res TGA with a flowing nitrogen atmosphere. Differential scanning calorimetry (DSC) measurements were conducted using a TA Instrument 2910 Modulated DSC with a heating rate of 5° C./min.

Infrared (IR) spectra were obtained using a Nicolet 20DXB Fourier Transform Infrared Spectrometer. Samples were prepared by placing a thin layer of an analyte in solution on a salt plate (NaCl) and then allowing the solvent to evaporate.

H-1 and Carbon-13 NMR spectra were obtained on a Varian Mercury-Plus 300 MHz Spectrometer, and the chemical shifts are reported in ppm with tetramethylsilane as the internal standard. Samples were prepared in deuterated trichloromethane.

Inductively Coupled Plasma Mass Spectrometer (ICP-MS) measurements were recorded on a Fisons Plasmaquad II+ICPMS. Samples were diluted as required.

Mixtures of activated carbon, BPEI, sulfur and ZnDEDC were cured on a PHI High Temperature Smart Press at 130° C. for 25 minutes.

Elemental Mercury Capture

Figure 6:
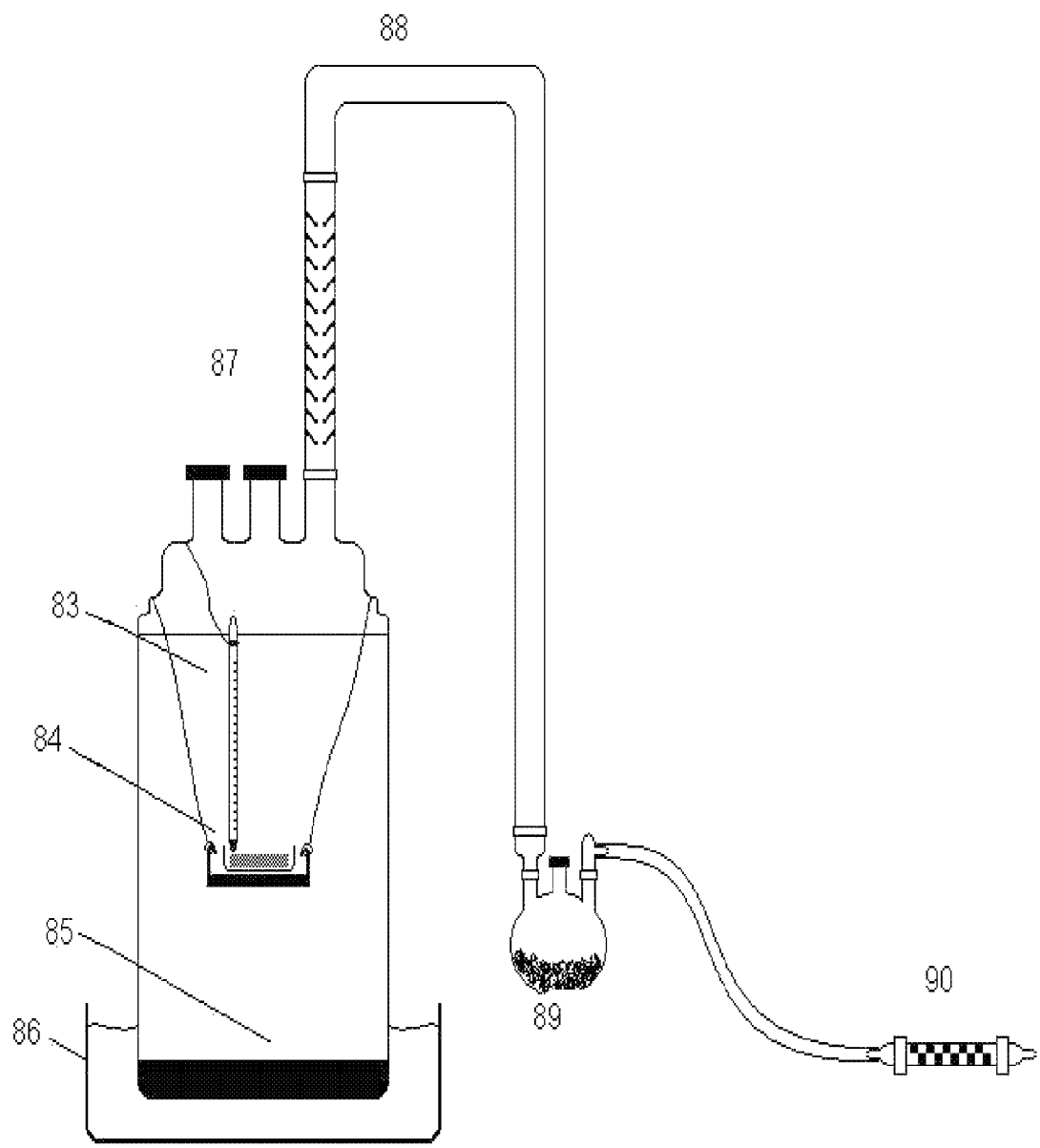

FIG. 6 shows a schematic representation of reaction vessel for testing the efficiency of elemental mercury capture by MAC samples. A clean, dry, Petri dish (60×15 mm) 84 was weighed, and the weight was recorded. In order to prevent mercury deposition, the external surface of the Petri dish was then wrapped with Parafilm® M sealing film [BRAND GMBH and CO KG, Wertheim (Germany)] a stretchable, chemical resistant self-sealing film. The bottom of the Petri dish 84 was evenly covered with the adsorbent samples (2 g). The dish was suspended in the mercury chamber 85 containing about 10 mL of liquid mercury. The mercury chamber 85 was heated using an external oil bath 86. The oil bath temperature was raised to 140° C., and held at that temperature using a temperature controller. The bath temperature maintained the chamber temperature surrounding the suspended Petri dish at about 100° C. as read on a thermometer 83. An air condenser 87, glass tube 88, iodine chamber 89 and drying tube 90 were used to trap any mercury vapor escaping and prevent moisture from entering into the reaction chamber. The dish was left in the chamber for 24 hours. The oil bath 86 was removed and the mercury chamber 85 was allowed to cool to room temperature. The Petri dish 84 was removed from the chamber and the Parafilm® was removed. The weight of the Petri dish containing MAC was recorded, then the Parafilm® was removed and the dish and sample were weighed.

Comparative Example A

Testing Commercial, Activated Carbon Samples for $Hg^0$ Capture

Using the method described above in the measurements section, efficacies of three commercially available activated carbon samples were tested to select the activated carbon with the highest capture of $Hg^0$. Findings from testing CAC, DH, and DHL are summarized in Table 1 below. The DHL had a higher affinity for capturing elemental mercury in our test method. DHL was then selected to use in polymer-carbon sorbents.

TABLE 1

Capture of Elemental Mercury for Commercial Activated Carbon in mg $Hg^0$ per gram Activated Carbon

| Activate Carbon | Trial 1 | Trial 2 | Trial 3 | Average |
|---|---|---|---|---|
| CAC | 51 | 60 | 46 | 52 |
| DH | 32 | 29 | 29 | 30 |
| DHL | 73 | 64 | 75 | 71 |

Example 1

Preparation of Curable Amine-Containing Polymers

Three different poly(ethyleneimines)s, (BPEIs), having nominal number average molecular weights of 1300, 2000, and 10,000 were selected as amine-containing polymers. They were each allowed to react with allyl bromide to form allyl-capped poly(ethyleneimine), ACP, as the curable amine-containing polymers.

The procedure for the 10,000 Mn follows as an example: 5.0 g (~0.0005 mole) was weighed into a 150 mL beaker, and DMAC (50 mL) was added to the beaker, while stirring using a magnetic stir bar, to prepare a clear solution. A four-necked, round-bottomed flask, fitted with an overhead stirrer, nitrogen inlet, thermometer, and an addition funnel served as the reaction vessel. The BPEI solution was added to the reaction vessel. The beaker containing the polymer solution was washed with additional 20 mL of DMAC and the washing was added to the reaction vessel, followed by about 5.0 g (about 0.036 mol) anhydrous potassium carbonate about 5.0 g, excess). Allyl bromide (25 mL, about 0.148 mol) was transferred to a dropping funnel, and then added drop-wise over a ten-minute period to the reaction vessel, while the reaction was allowed to continue with stirring. An initial exotherm of about 40° C. was observed and the color of the reaction mixture turned light orange. The reaction was allowed to continue at room temperature for about 10 hours under a constant purge of nitrogen, also at room temperature. The reaction vessel was protected from external light sources during the reaction by covering it with aluminum foil. This was done to protect the newly-formed allyl groups on the polymer from light-induced polymerization.

At the completion of the reaction, excess DMAC was decanted from a DMAC-swollen reaction product. To remove salts (particles of excess potassium carbonate, potassium bromide), the DMAC-swollen reaction product was dissolved in 50 mL of methanol and filtered through Celite® diatomaceous earth, to form a filtrate containing allyl-capped poly (ethyleneimine) (ACP). Then, the filtrate was added drop-wise into rapidly stirring anhydrous diethyl ether. The ACP in the filtrate was not soluble, and precipitated out of the diethyl ether, and it was filtered. The residue was re-dissolved in methanol and the solution was transferred to a 500 mL round-bottomed flask. The methanol, along with any residual ether, was removed from the ACP using a rotary evaporator at reduced pressure. The flask, covered with aluminum foil, was dried in a vacuum oven at room temperature for an additional 12 hours to remove any residual diethyl ether or methanol, producing a dried and purified ACP. The dried, purified ACP, as a flaky orange solid, was removed from the flask and stored in a brown vial at −20° C.

Characterization of ACP from BPEI Having a Nominal Mn of 10,000

H-1 NMR spectra of a BPEI starting material and product ACP were obtained. The H-1 absorbances of the BPEI were localized between 2.5 and 2.8 ppm. The absorbances in the H-1 spectrum of ACP were dispersed over a range from 2.5 to 6.5 ppm, and shifted downfield from the absorbances of BPEI. On the ACP spectra, the set of absorbances between 5.0 and 6.5 ppm can be attributed to hydrogen nuclei attached to $sp^2$ hybridized carbons. The absorbances localized between 4.0 and 4.8 ppm correspond to hydrogen nuclei attached to secondary amines. The absorbances from 2.5 to 4.0 can be attributed to hydrogen nuclei attached to $sp^3$-hybridized carbons. The downfield shift of the absorbances observed in the ACP spectrum, especially the shift attributed to hydrogen atoms attached to the sp³ hybridized nuclei, can possibly be explained by long-range through-space interactions.

Infrared spectroscopy (IR) was performed to confirm the addition of an allyl group to BPEI samples. The IR spectrum was taken of ACP, formed from BPEI having a nominal Mn of 10,000 showed absorbance at 3380 cm$^{-1}$ due to N—H stretching. The absorbances at 2955 cm$^{-1}$, 2527 cm$^{-1}$, and 1449 cm$^{-1}$ are due to sp³ hybridized C—H stretches. The presence of the alkene is evident at the absorbance at 1629 cm$^{-1}$ corresponding to a carbon-carbon double bond. Furthermore, the absorbances centered at 3100 cm$^{-1}$, 990 cm$^{-1}$, and 927$^{-1}$ correspond to the C—H deformations of a terminal sp² hybridized carbon. These are consistent with the addition of the allyl group to the primary amine of the poly(ethyleneimine).

In addition, comparing the ACP with IR spectra of a BPEI having a nominal Mn of 10,000, FIG. 9, the ACP lacked a primary amine absorbance at 1588 cm$^{-1}$, which was present in the BPEI. The loss of this peak is consistent with primary amine groups from BPEI being consumed in the reaction. The relative intensity of the absorbance at 3277 cm$^{-1}$ in BPEI was reduced in the ACP, which is also consistent with loss of the primary amine groups.

Thermal Gravimetric Analysis (TGA) was used to determine decomposition temperature of ACP samples. An ACP made from a BPEI having a nominal Mn of 10,000 was found to start decomposing at about 158° C., leading to about a 75% decrease in mass, until the temperature reached about 360° C.

TGA was also used to determine thermal stability of ACP at constant temperature. An isothermal TGA thermogram was obtained at 130° C. for 60 minutes for an ACP made from a BPEI having a nominal Mn 10,000. The thermogram showed a mass loss of about 5.9%, probably due to the loss of absorbed moisture, similar to that of LGH.

Comparative Example B

Vulcanization of a Curable Amine-Containing Polymer, ACP, without Carbon

Comparative Sample 1, ACP without any carbon, was prepared for cure in the absence of activated carbon. A mixture was prepared using 100 parts ACP, from a PEI having a Mn of about 10,000, 13 parts sulfur, and 1 part ZnEDC. A DSC thermogram was obtained to determine the temperature necessary to carry out the crosslinking reaction. An examination of the thermogram showed the presence of sulfur melting endotherms at 115° C. and 119° C., but a cure endotherm was absent in the sample before cure. Despite this indication that the polymer might not cure, the mixture sample was placed in a press and heated at 115° C. for 15 minutes. The mixture turned to a dark brown sticky material, and then hardened and became a brittle material upon cooling. The brittle material dissolved easily in methanol at room temperature. This indicates that carbon is essential for the curing process.

Example 2

Polymer-Carbon Sorbent Cure Temperature Study

DSC of uncured samples was used to determine a curing temperature for polymer-carbon sorbents at different sulfur levels. The samples were made from an ACP prepared from a PEI having a Mn of about 10,000. Thermograms from the DSC of uncured samples had broad endotherm curves, over a temperature range from 40 to 150° C. Endotherms of uncured samples had peaks ranging from 90 to 112° C., indicating cure temperature(s) for the samples.

Sample 2(a) was made using 100 parts ACP, 7 parts sulfur, 1 part ZnEDC, and 200 parts DHL. The DSC thermogram obtained prior to curing exhibited a curing endotherm peak at 111° C., with an activation energy of 92.27 J/g. After curing for 30 minutes at 111° C., an endotherm was not observed, indicating the completion of the curing process.

Sample 2(b) was made with 100 parts ACP, 13 parts sulfur, 1 part ZnEDC, and 200 parts DHL. The sample was cured at 92° C. for 15 minutes.

Sample 2(c) was made with 100 parts ACP, 11 parts sulfur, 1 part ZnEDC, and 200 parts DHL. The pre-cure thermogram showed a peak at 103° C. and an activation energy of 148 J/g. After curing for 15 minutes at 103° C., an endotherm with a peak at 84° C. and an activation energy of 31 J/kg was evident. After curing an additional 15 minutes at 103° C., a minor endotherm was found with a peak at 105° C. and an energy of 49 J/kg. That is, the additional cure did not reduce the endotherm further. This appeared to indicate that the cure may have been completed, but that other chemical processes may be contributing to the endotherm.

Based on the observations above, and to ensure curing was complete for all samples, a curing time of 25 minutes and a curing temperature of 130° C. were chosen for further studies.

Example 3

Preparation of Polymer-Carbon Sorbent with High Sulfur Content

The polymer-carbon sorbent samples were prepared from the samples of ACP prepared in Example 1, using the following general procedure. For these samples, 200 parts of DARCO® Hg-LH (DHL) and 100 parts of ACP were used. The amount of sulfur and that of ZnDEDC was varied, while keeping the mass ratio of sulfur to ZnDEDC fixed at 5:1. For each molecular weight, samples were made using 30, 40, 45 and 50 parts by weight sulfur, respectively, for 100 parts by weight of the ACP. These amounts are in excess of that required to show a cure of the polymer-carbon sorbents used in Example 2. The mercury capture of the sorbent samples was then compared to that of DHL.

As an example of the procedure, a sample preparation with 50 parts sulfur and subsequent curing is as follows: ACP (5 g), sulfur (2.5 g), and ZnEDC (0.5 g) were weighed and transferred to an evaporation dish and grounded to powdery form using a pestle. That is, the first mixing step was done in solid state. Methanol (50 mL) was added to form a mixture, and mixture was stirred to dissolve the ACP. (Sulfur and ZnEDC were not soluble in the methanol). DHL (10 g) was added to the mixture and stirred; the resulting slurry, containing the ACP, sulfur, ZnEDC and DHL was allowed to dry overnight in the dark. The slurry was then placed in a vacuum oven at room temperature for 12 hours to ensure complete removal of methanol. The dried, uncured polymer-carbon sample was then ground to a powdery form with mortar and pestle, to ensure an even distribution of ZnEDC and sulfur.

To cure samples, a dried, uncured polymer-carbon sample, prepared as above, was placed between two TEFLON sheets and pressed to a pressure at about 4500 psi. The temperature of the heating plates was gradually increased from 20° C. to 130° C. (Heating Rate: 5° C./min). The cross-linking reaction was allowed to continue at this temperature over a period of 25 min. The cured polymer-carbon powder sample was then stored at room temperature.

Cure was confirmed by DSC thermograms. In these samples, the thermograms of uncured polymer also had peaks for melting point endotherms of two confirmations of sulfur, i.e., orthorhombic and monoclinic. The sulfur melting peaks were sharper than the broad reaction endotherms. However, these melting peaks disappeared in the thermogram of a cured sample.

To determine the maximum amount of sulfur, or saturation point, for the 10,000 Mn polymer, the sulfur content in a mixture was increased by 10 wt % per sample, until sulfur melting point peaks appeared in the DSC thermogram of a cured sample. For this sample, the sulfur saturation point was obtained when sulfur reached a concentration of 60 parts per 100 parts by weight polymer. DSC of thermograms of cured samples with 60, 70, and 80 parts sulfur per 100 parts of polymer showed melting peaks for sulfur, indicating free sulfur in the samples, and therefore past the samples' saturation point of sulfur.

Example 4

Cure Using Lower Amount of Carbon

Sample 4 was prepared with 100 parts ACP, 100 parts DHL, 30 parts sulfur, and 6 parts ZnDEC. The DSC thermogram obtained prior to curing showed the presence of a curing endotherm, as well as sulfur melting endotherms. The sample was cured at 130° C. for 25 minutes. The endotherm observed in the DSC after curing did not exhibit the melting sulfur melting endotherms, indicating that the cure was complete.

Example 5

Modification with Thiols

Two of the polymer-carbon sorbents were modified further by reacting with 2-mercaptoethanol. Sample 2(b), with 100 parts ACP (10,000 Mn PEI), 11 parts sulfur, 1 part ZnEDC, and 200 parts DHL and Sample 3(c) with 100 parts ACP (10,000 Mn PEI), 50 parts sulfur, 10 parts ZnEDC and 200 parts DHL were modified to form samples 5(a) and 5(b), respectively. The reaction with 2-mercaptoethanol was intended to cleave the disulfide linkages in the crosslinked polymer to introduce thiol moieties. Thiols have an affinity to react with $Hg^0$ and $Hg^{+2}$. The reaction proceeds via addition of the mercuric ion to two thiol moieties, followed by elimination of two protons. Therefore, modifying with the 2-mercaptoethanol should have increased the sorbent capture of ionic mercury.

The polymer-carbon sorbents were treated by reacting with a 10× stoichiometric excess of 2-mercaptoethanol, in a slurry for 3 hours at 50° C. The slurry was rinsed in chloroform in a Büchner funnel to remove excess 2-mercaptoethanol. These samples were used to determine their abilities to capture $Hg^0$ and $Hg^{+2}$.

Example 6

Elemental Mercury Capture Measurement

Table 2 below shows the data for elementary mercury capture in mg Hg/g sample for the samples with high loadings of sulfur. The mercury capture of the DHL alone was 138.2 mg/g when tested alone. The data below show improvement over the DARCO® HG LH product for many of the samples.

TABLE 2

Elemental Mercury Capture (mg/g)

| Parts Sulfur | Mn ~10000 | Mn ~1300 | Mn ~2000 | DARCO ® Hg-LH |
|---|---|---|---|---|
| 50 | 159.5 | 234 | 284.55 | 145 |
| 45 | 376.5 | 298.2 | 315.6 | 145 |
| 40 | 97.75 | 195.6 | 209.8 | 145 |
| 30 | 115.87 | 197.4 | 253.4 | 145 |

Figure 7:
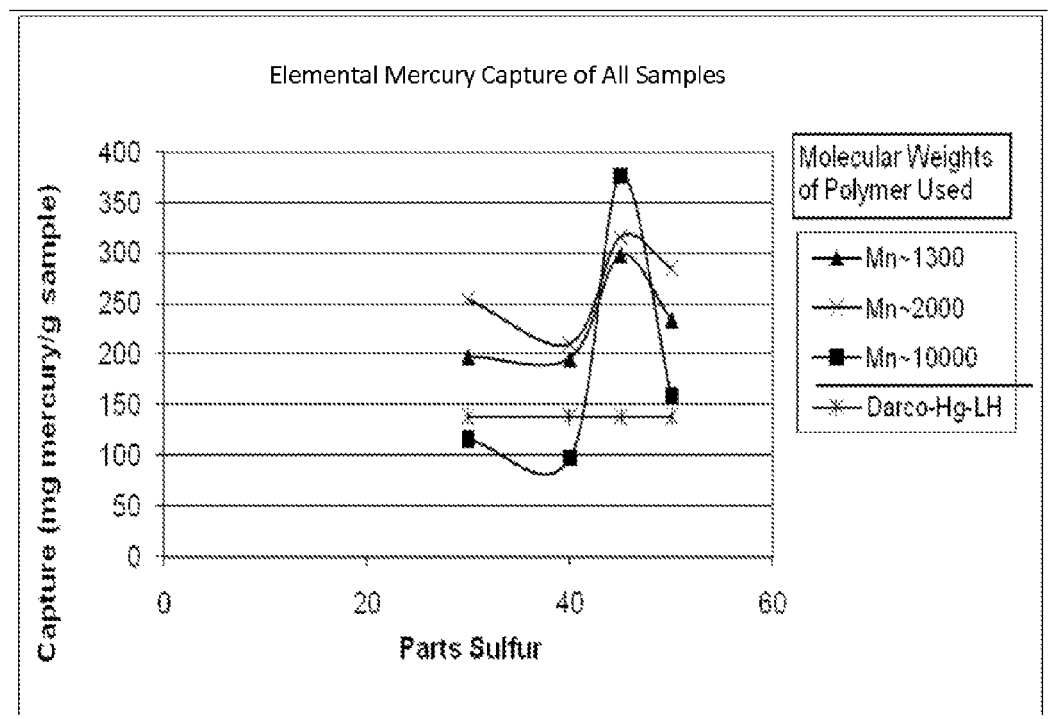

FIG. 7 shows the a graph of the milligrams (mg) mercury capture per gram (g) adsorbent as a function of the parts sulfur added for each of the nominal molecular weights (Mn 1300, 2000, and 10000) of poly(ethyleneimine). A line representing unmodified DHL (i.e. no sulfur added) is drawn in for comparison. The relationship between parts sulfur and elemental mercury adsorption appears to be nonlinear.

Example 7

$Hg^{+2}$ Capture Measurement

A $1.75\times10^{-3}$ M aqueous solution of mercuric nitrate (10 mL) was added to a test tube (150×15) containing MAC (25 mg). The resulting heterogeneous mixture was allowed to stir at room temperature for 30 minutes. The heterogeneous mixture was then transferred to a centrifuge tube and centrifuged at 1228 g for 20 minutes. An aliquot was analyzed for residual $Hg^{+2}$ using ICPMS spectrometer.

The mixture of MAC and mercuric nitrate was refluxed in a 50 mL round-bottom flask for about 30 minutes, cooled; an aliquot was collected using the same procedure outlined above.

The DHL activated carbon captured 76.45 percent of the amount of the initial mercury ($Hg^{+2}$) added to the solution. Table 3 below shows the data for $Hg^{+2}$ captured per sample in percent. The data below show improvement over the DARCO® HG LH product for many of the samples.

TABLE 3

Mercury (II) Capture %
of initial amount of Mercury added in solution

| Parts Sulfur | Mn ~1300 | Mn ~2000 | Mn ~10000 | DARCO ® Hg-LH |
|---|---|---|---|---|
| 50 | 52.06 | 68.32 | 92.98 | 75 |
| 45 | 71.45 | 57.37 | 95.82 | 75 |
| 40 | 52.10 | 78.59 | 80.46 | 75 |
| 30 | 48.85 | 76.35 | 98.65 | 75 |

Figure 8:
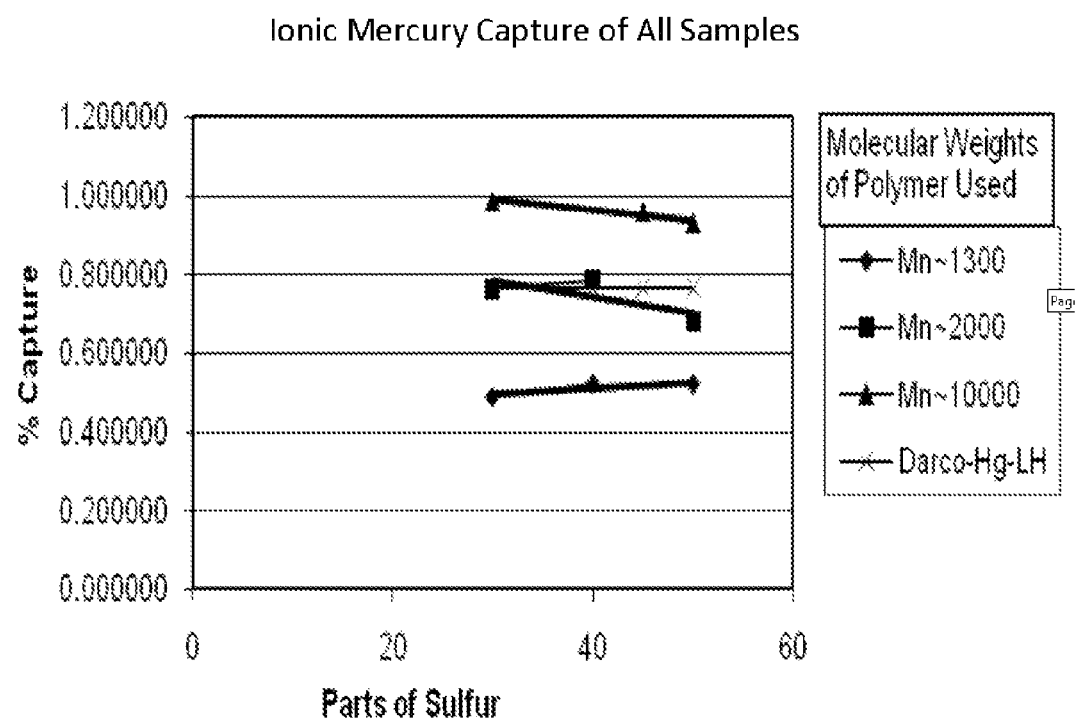

FIG. 8 shows percent added $Hg^{+2}$ as $HgNO_3$ in deionized water as a function of the amount of sulfur added to samples.

Example 8

Heavy Metal Capture Measurement

Aqueous solutions of water-soluble heavy metals salts, preferably chlorides of cadmium, nickel, cobalt, chromium, and manganese, are prepared separately. The concentration of each solution is maintained at $1\times10^{-3}$ M. Ten mL of each solution is transferred into each of nine (150×15) test tubes. To each test tube, MAC (500 mg) is added and the heterogeneous solutions (three tubes in a group) are mixed for 1, 2, and 3 hours, respectively, and then centrifuged (1228 G) for 5 minutes. The supernatants are decanted into separate test tubes. Each sample is then diluted to 100 parts per billion (ppb) and the concentrations of heavy metals present in the supernatants are measured in triplicate (and an average calculated) using ICP-MS spectroscopy. Table 4 below is an example of the heavy metal ion capturing ability of MAC from an aqueous solution.

TABLE 4

Heavy Metal Capturing Abilities of MAC

| Chloride Salt | 1 Hour % Capture | 2 Hour % Capture | 3 Hour % Capture |
|---|---|---|---|
| Chromium(III) Chloride | 69.86384 | 67.61447 | 83.64704 |
| Cobalt(II) Chloride | 44.01192 | 61.66832 | 37.91791 |
| Manganese (II) Chloride | 74.91237 | 89.95344 | 97.86125 |

Although the invention has been described with reference to its preferred embodiments, those of ordinary skill in the art may, upon reading and understanding this disclosure, appreciate changes and modifications which may be made which do not depart from the scope and spirit of the invention as described above or claimed hereafter.

What is claimed is:

1. A polymer-carbon sorbent for removing carbon dioxide, heavy metal species and toxic materials from a flue gas from a combustion process from coal-fired power plants which sorbent comprises:
   a) a carbonaceous sorbent material, and
   b) a cured amine-containing polymer wherein
      i) a sulfur agent, S8 in the form of either orthorhombic, monoclinic, or amorphous forms, used to cure the curable amine-containing polymer, is selected from allotropes of elemental sulfur, which is added in excess of the amount required to cure the curable amine-containing polymer, in the presence of a carbonaceous sorbent material, and
      ii) the curable amine-containing polymer is formed by reacting an amine-containing polymer with an allyl halide.

2. The sorbent of claim 1 further comprising thiol moieties.

3. The sorbent of claim 1, wherein the carbonaceous sorbent material comprises activated carbon, treated activated carbon, powdered activated carbon, activated charcoal, activated coke, char, incompletely burned carbon from a combustion process, crumb rubber of appropriate mesh size (400-450), or carbon black.

4. The sorbent of claim 3 wherein the carbonaceous sorbent material is carbon black.

5. The sorbent of claim 1 wherein the amine-containing polymer is poly(p-aminostyrene), poly(allylamines), poly(aniline) poly(vinylamine) and its copolymers, poly(ethyleneimine), chitosan, or amine containing copolymers.

6. The sorbent of claim 5 wherein the amine-containing polymer is poly(ethyleneimine).

7. The sorbent of claim 1 wherein an amount of the sulfur agent present is from about 5 to about 60 parts by weight per 100 parts by weight of curable amine-containing polymer.

8. The sorbent of claim 1 wherein the sulfur agent is added in an excess amount of more than twice the amount required to cure the curable amine-containing polymer.

9. The sorbent of claim 1 wherein the heavy metal species are ions or elemental forms of arsenic, cadmium, cesium, copper, gold, iron, lead, mercury, palladium, platinum, plutonium, selenium, silver, strontium, thallium, uranium or mixtures thereof.

10. The sorbent of claim 9 wherein the heavy metal species is mercury.

11. The sorbent of claim 10 wherein the mercury is elemental mercury wherein: a) the sorbent's absorption capacity for mercury is about three times that of DARCO®-Hg-LH, b) the sorbent requires injection into the flue gas stream less frequently than DARCO®-Hg-LH, and/or c) has a longer residence time.

12. The sorbent of claim 1, wherein the ratio by weight of carbonaceous sorbent material to cured amine-containing polymer is from about 50:100 to 250:100, while retaining constant the amounts of other components of the sorbent.

13. The sorbent of claim 1 wherein the sorbent possess similar or superior thermal stability to the thermal stability of commercially available activated carbon.

14. The curable amine-containing polymer of claim 1 wherein the curable amine-containing polymer has a number weight average of about 1,000 to about 10,000, secondary, and tertiary amine groups, and allyl end-groups.

* * * * *